R. S. MENNIE.
STAY BOLT STRUCTURE.
APPLICATION FILED AUG. 29, 1919.
1,424,733.
Patented Aug. 1, 1922.
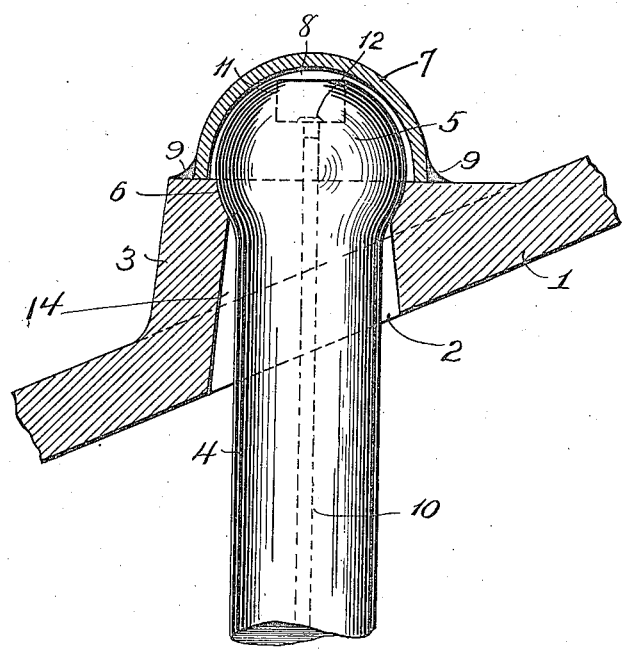
INVENTOR
R. S. Mennie
By Seymour & Bright
Attorneys

UNITED STATES PATENT OFFICE.

ROBERT S. MENNIE, OF CHICAGO, ILLINOIS, ASSIGNOR TO FLANNERY BOLT COMPANY, OF PITTSBURGH, PENNSYLVANIA.

STAY-BOLT STRUCTURE.

1,424,733.  Specification of Letters Patent.  Patented Aug. 1, 1922.

Original application filed February 5, 1916, Serial No. 76,333. Divided and this application filed August 29, 1919. Serial No. 320,648.

*To all whom it may concern:*

Be it known that I, ROBERT S. MENNIE, a citizen of Canada, and a resident of Chicago, in the county of Cook and State of Illinois, have invented certain new and useful Improvements in Stay-Bolt Structures; and I do hereby declare the following to be a full, clear, and exact description of the invention, such as will enable others skilled in the art to which it appertains to make and use the same.

This invention relates to improvements in staybolt structures for boilers,—this application being a division of application for patent filed by me on the 5th day of February 1916 and designated by Serial No. 76,333.

The object of my present invention is to provide a bearing for the head of a staybolt which shall be built up on the outer face of the boiler sheet around the bolt opening and constitute, in effect, an integral part of the structure of the seat; which shall be particularly useful for the mounting of the head of a radial staybolt on an inclined or roof sheet, and to effectually enclose the head of the staybolt and its bearing on the built-up boss.

With this and other objects in view, the invention consists in certain novel features of construction and combinations of parts as hereinafter set forth and pointed out in the claims.

The accompanying drawing is a sectional view showing an embodiment of my invention.

1 represents the inclined roof or cross sheet of a boiler having a staybolt opening 2. Around the opening 2, a boss 3 is built up by welding with a welding alloy, so that the component parts of said alloy shall be fused and welded together and so that the boss as a whole shall be welded to the outer face of the boiler sheet and become an integral part of the latter. In the building up of the weld forming the boss on the inclined boiler sheet, said boss is so shaped that its outer end shall be in an approximately horizontal plane substantially at right angles to the longitudinal axis of a stay bolt 4, the rounded head 5 of which is seated on said boss. To provide a suitable mounting for the bolt head, the built-up boss is formed with a depression forming a curved or rounded seat 6.

A cap or closure 7 which, in the embodiment of the invention shown in the drawing, is hemispherical and is disposed upon the outer end of the built-up boss 3 in a manner to enclose the bolt head and its seat. The dimensions of the cap or closure is such as to provide a clearance space 8 and the peripheral portion of said cap or closure is fixedly united to the outer end of the built-up boss 3 by a weld 9.

For testing purposes, the bolt may be provided with a tell-tale hole 10 which may extend from the inner end of the bolt and terminate within the head thereof. The head of the bolt may be provided with a socket 11 for the accommodation of a tool and a plug 12 welded in the outer end of the tell-tale hole serves to effect the termination of the outer end of said hole within the head of the bolt.

The interior of the bearing boss is so formed as to provide a continuation of the opening 2, as at 14, and the bolt opening is of such size that adequate play for the bolt will be insured.

Having fully described my invention, what I claim as new and desire to secure by Letters-Patent, is:—

1. In a staybolt structure, the combination with a boiler sheet having a bolt opening, of a mass of welding alloy having welded union with the outer face of the boiler sheet and having a shape forming an annular boss around the opening in the boiler sheet, a closure engaging said boss of welding alloy, and a staybolt having a head enclosed by said boss and closure.

2. In a staybolt structure, the combination with a boiler sheet having a bolt opening, of a mass of welding alloy having welded union with the outer face of the boiler sheet and having a shape forming an annular boss around the opening in the boiler sheet and having a part forming a seat for the head of a staybolt, a staybolt having a head seated on said boss, and a closure having welded union with said boss of welding alloy.

3. In a staybolt structure, the combination with an inclined boiler sheet having an opening, and a staybolt passing through said opening, of a boss on said inclined sheet around the opening therein, the outer end of said boss being approximately in a horizontal plane substantially at right angles to the longitudinal axis of the staybolt, said boss having a seat for the head of the staybolt, and a closure for the bolt head and its seat, said closure welded to said boss.

4. In a staybolt structure, the combination with an inclined boiler sheet having an opening, and a staybolt passing through said opening, of a built-up weld forming a boss around said opening and having a seat for the head of the staybolt, the outer end of the boss in which the seat is formed being in an approximately horizontal plane, and a closure over the bolt head and welded at its edge to the end of the built-up weld forming the boss.

In testimony whereof, I have signed this specification in the presence of two subscribing witnesses.

ROBERT S. MENNIE.

Witnesses:
EDWARD M. FLINT,
HARRY F. NEBENGOW.